(12) United States Patent  (10) Patent No.: US 9,182,826 B2
Powledge et al.  (45) Date of Patent: Nov. 10, 2015

(54) GESTURE-AUGMENTED SPEECH RECOGNITION

(71) Applicant: Intel Corporation, Santa Clara, CA (US)

(72) Inventors: Pauline S. Powledge, Seattle, WA (US); Carl C. Hansen, Aloha, OR (US); Martin Pettersson, Portland, OR (US); David Poisner, Carmichael, CA (US)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 13/683,206

(22) Filed: Nov. 21, 2012

(65) Prior Publication Data

US 2014/0142937 A1 May 22, 2014

(51) Int. Cl.
*G10L 15/26* (2006.01)
*G06F 3/01* (2006.01)
*G10L 15/22* (2006.01)

(52) U.S. Cl.
CPC ............... *G06F 3/017* (2013.01); *G10L 15/22* (2013.01); *G06F 2203/0381* (2013.01)

(58) Field of Classification Search
CPC ..... G06F 3/017; G06F 3/0488; G06F 17/246; G06F 17/211; G06F 2203/0381; G06F 3/041; G06F 2203/04803; G06F 3/03547; G06F 3/013; G06F 3/03545
USPC .............. 704/270, 270.1, 275, 250, 251, 235, 704/1–10, 255, 257
See application file for complete search history.

(56) References Cited

U.S. PATENT DOCUMENTS

| | | | |
|---|---|---|---|
| 2010/0023314 A1* | 1/2010 | Hernandez-Rebollar | 704/3 |
| 2011/0115702 A1* | 5/2011 | Seaberg | 345/156 |
| 2012/0180002 A1* | 7/2012 | Campbell et al. | 715/863 |
| 2013/0144629 A1* | 6/2013 | Johnston et al. | 704/275 |

* cited by examiner

*Primary Examiner* — Huyen Vo
(74) *Attorney, Agent, or Firm* — Jordan IP Law, LLC

(57) ABSTRACT

Methods and systems may provide for generating text based on speech input and recognizing one or more hand gestures. Additionally, an adaptation of the text may be conducted based on the hand gestures. In one example, the hand gestures are associated with operations such as punctuation insertion operations, cursor movement operations, text selection operations, capitalization operations, pause of speech recognition operations, resume of speech recognition operations, application-specific actions, and so forth, wherein the adaptation of the text includes the associated operation.

25 Claims, 2 Drawing Sheets

US 9,182,826 B2

GESTURE-AUGMENTED SPEECH RECOGNITION

BACKGROUND

1. Technical Field

Embodiments generally relate to automatic speech recognition systems. More particularly, embodiments relate to gesture-augmented speech recognition systems.

2. Discussion

Conventional dictation solutions may use automatic speech recognition (ASR) to identify words, spoken punctuation and commands in speech input received from a microphone, wherein text is generated from the recognition/identification results. In such a case, the user might use a keyboard and/or mouse to correct the textual ASR output. While such an approach may be suitable under certain circumstances, there remains considerable room for improvement. For example, speaking punctuation and commands can be awkward from the perspective of the user, particularly in a dictation setting. Moreover, the manipulation of a keyboard/mouse to correct the ASR output may conflict with the user's desire to replace those devices with ASR functionality.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include an apparatus having a speech module to generate text based on speech input and a gesture module to recognize one or more hand gestures. The apparatus may also have an adaptation module to conduct an adaptation of the text based on the one or more hand gestures.

Embodiments may also include a platform having a microphone to receive speech input, and a recognition system having a speech module to generate text based on the speech input. The recognition system can also include a gesture module to recognize one or more hand gestures and an adaptation module to conduct an adaptation of the text based on the one or more hand gestures. Additionally, the platform may also include a display device to present the text.

Embodiments may also include a computer readable storage medium having a set of instructions which, if executed by a processor, cause a computer to generate text based on speech input. The instructions, if executed, may also cause a computer to recognize one or more hand gestures and conduct an adaptation of the text based on the one or more hand gestures.

Embodiments may also include a method that involves generating text based on speech input, and receiving image data from one or more of an infrared (IR) camera, a time of flight camera and a plurality of stereoscopic cameras. The method can also provide for recognizing one or more hand gestures based on the image data, wherein recognizing the one or more hand gestures includes identifying one or more of fingers and a direction of movement. Additionally, the one or more hand gestures may be associated with an operation including one or more of a punctuation insertion, a cursor movement, a text selection, a capitalization, a pause of speech recognition, a resume of speech recognition and an application-specific action. The method may also provide for conducting an adaptation of the text, wherein the adaptation includes the operation.

Figure 1:
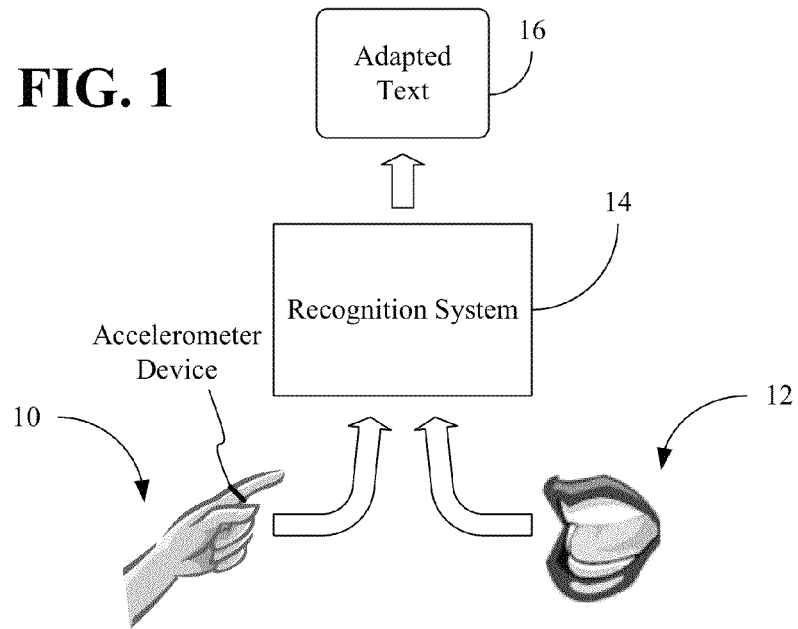
FIG. 1 is a block diagram of an example of a scheme to augment speech recognition with gesture recognition according to an embodiment.

FIG. 1 shows a scheme in which hand gestures 10 and audible speech 12 are used by a recognition system 14 to generate adapted text 16. The gestures 10 may be used, for example, to enter punctuation and/or commands concurrently with the speech recognition (e.g., during generation of the text), as well as to edit the text during playback. For example, the gestures 10 might be associated with operations for punctuation insertion, cursor movement, text selection, capitalization, pause of speech recognition, resume of speech recognition, application-specific actions (e.g., spreadsheet specific actions, photo editing specific actions), and so forth. Of particular note is that the illustrated text 16 is generated without the use of a keyboard or mouse. Elimination of such devices to enter and/or correct text can significantly enhance the user experience and ultimately provide an "entry device free" environment. The illustrated scheme may be used for dictation and/or transcription in a wide variety of settings such as, business, educational, governmental, personal, and other settings.

Figure 2:
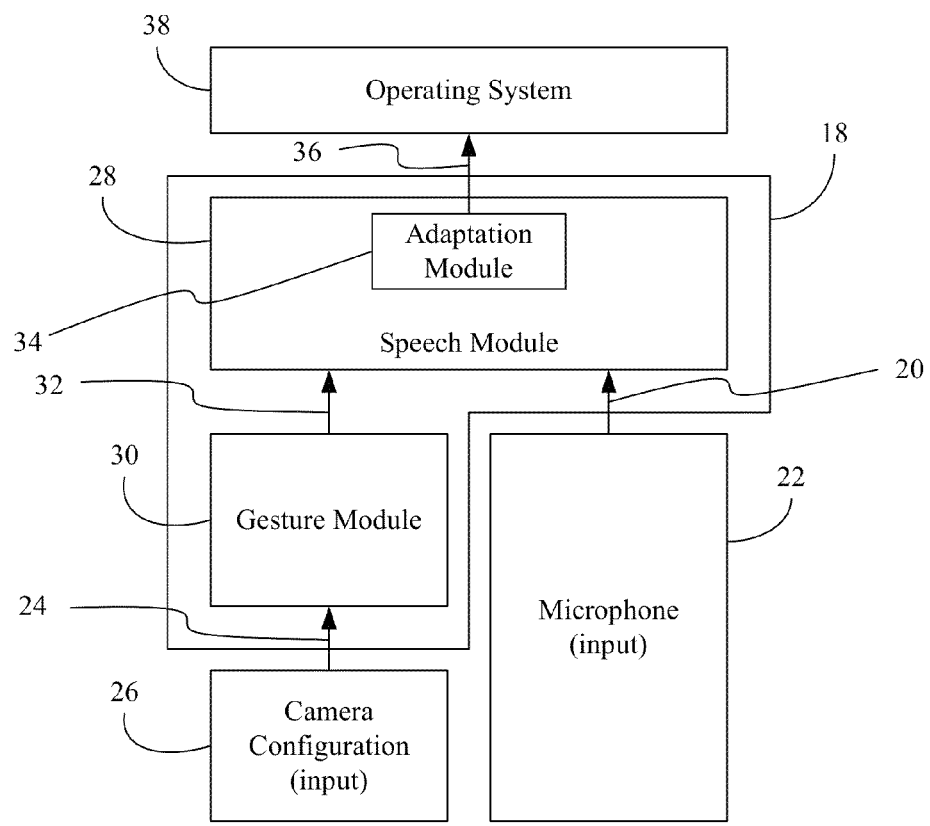
FIG. 2 is a block diagram of an example of a recognition system according to an embodiment.

Turning now to FIG. 2, a recognition system 18 is shown in which speech input 20 is obtained from a microphone 22 and image data (e.g., raw depth image information) 24 is obtained from a camera configuration 26. The microphone 22 may be directly or indirectly coupled to the recognition system 18. For example, in addition to a traditional wired connection, the microphone 22 might be connected via a discrete or combined USB (Universal Serial Bus, e.g., USB Specification 3.0, Rev. 1.0, Nov. 12, 2008, USB Implementers Forum) connection, a Bluetooth (e.g., Institute of Electrical and Electronics Engineers/IEEE 802.15.1-2005, Wireless Personal Area Networks) connection, low-power WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), wireless USB, and so forth.

The camera configuration 26 may include, for example, an IR camera, a "time of flight" camera, a plurality of stereoscopic cameras, etc., wherein the image data 24 reflects one or more hand gestures in three dimensions (i.e., including depth information). For example, an IR camera could acquire depth information acquired by illuminating the environment with an IR light pattern and detecting the distortion in the IR light pattern from objects with an IR sensor. A time of flight camera may use depth sensing technology that detects depth of objects by calculating the amount of time a pulsed light source takes to return to an emitter after reflecting off of an object in the scene. Moreover, multiple stereoscopic cameras may be mounted in a particular angular relationship such that the depth of objects in a scene can be calculated by the relative position of an object captured simultaneously by all cameras. Other technologies may be substituted for the camera configuration 26, as appropriate. For example, a wearable accelerometer device (e.g., an accelerometer built into a ring or bracelet) and/or glove input device may be used to detect very fine-grained control gestures, and may therefore be feasible replacements for the camera configuration 26.

The illustrated recognition system 18 includes a speech module 28 to generate text based on the speech input 20, wherein a gesture module 30 may recognize one or more hand gestures in the image data 24. In particular, the gesture module 30 may identify fingers and other hand shapes, as well as particular movements and directions of movement of the identified objects. The recognized movement may be three dimensional (3D), rotational, and so forth. The identified objects, movements, etc., may in turn be associated with one or more operations by an adaptation module 34, wherein gesture events 32 are used to trigger those operations, in the example shown. Thus, the adaptation of the text may involve applying the associated operations to the text. In one example, the adaptation module 34 issues one or more commands 36 to an operating system (OS) 38 to provide for the display of the adapted text.

For example, in order to insert punctuation, the user might employ a specialized "gesture vocabulary": a tap motion for a period, a quarter turn motion for a comma, tap motions with two fingers for a colon, a tap motion followed by a quarter turn motion for a semi-colon, one or two fingers in a downward swipe motion for quotes, and so forth, might be used. Other operations such as cursor movement (e.g., backward or forward "flick" motion), text selection (e.g., two finger swipe motion), capitalization, pause of speech recognition, resume of speech recognition, and application-specific actions may also be incorporated into the gesture vocabulary. Application-specific actions might include, for example, switching between value and formula modes in a cell of a spreadsheet application, formatting bullets in a slide presentation application, and so forth. The gesture vocabulary may be preset or user defined depending upon the circumstances. Moreover, the hand gestures may be made "in-air" or relative to a pressure sensitive surface.

Figure 3:
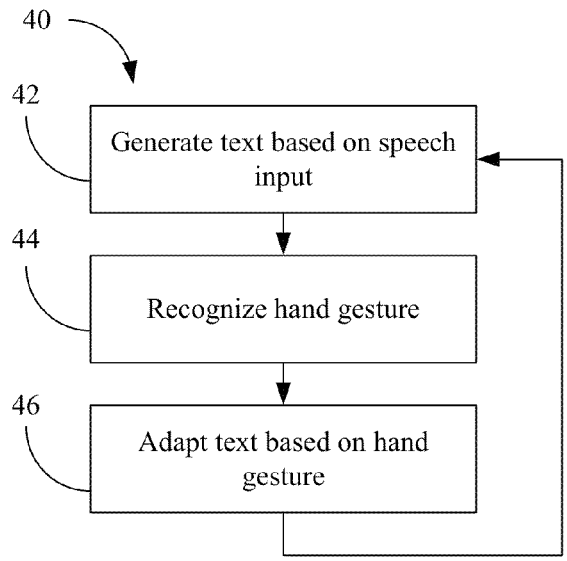
FIG. 3 is a flowchart of an example of a method of augmenting speech recognition with gesture recognition according to an embodiment.

FIG. 3 shows a method 40 of augmenting speech recognition. The method 40 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 40 may be written in any combination of one or more programming languages, including an object oriented programming language such as Java, Smalltalk, C++ or the like and conventional procedural programming languages, such as the "C" programming language or similar programming languages.

Illustrated processing block 42 provides for generating text based on speech input, wherein one or more hand gestures may be recognized at block 44. As already noted, recognizing the hand gestures may involve identifying objects (e.g., fingers, fingertips, knuckles, hand profiles, etc.), as well as the direction of movement of those objects, in image data from a camera configuration. Additionally, the hand gestures may be associated with operations such as punctuation insertion operations, cursor movement operations, and so forth. Block 46 may adapt the text based on the hand gestures. The method 40 may also be applied to playback operations (e.g., during playback of the text).

Figure 4:
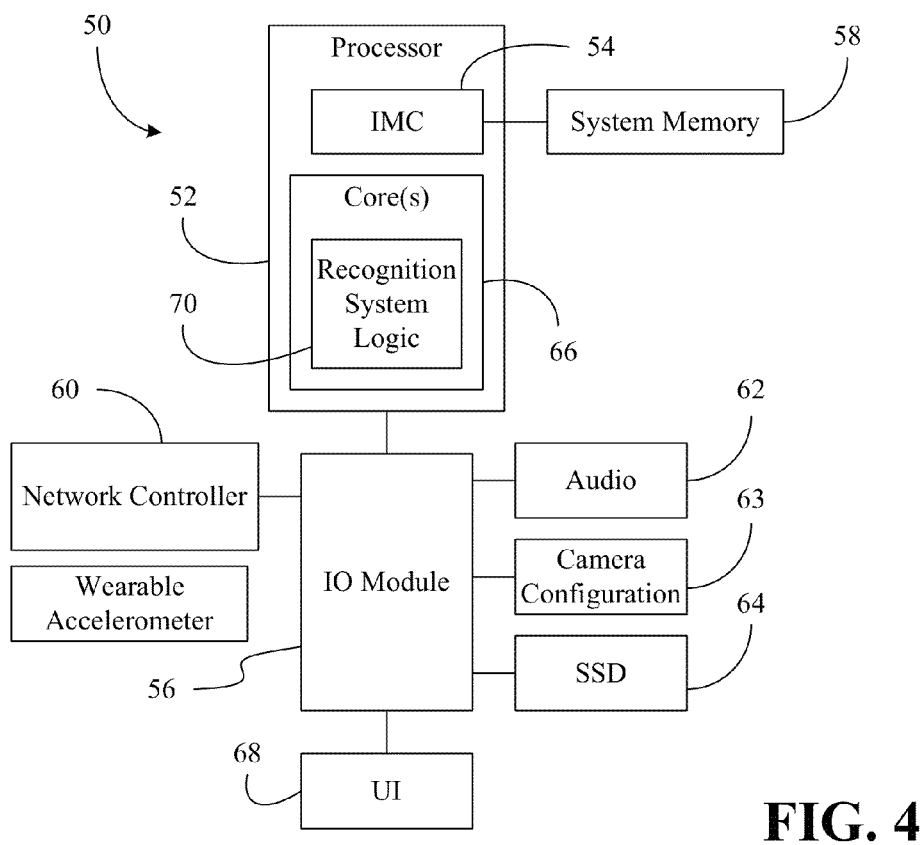
FIG. 4 is a block diagram of an example of a computing platform according to an embodiment.

Turning now to FIG. 4, a mobile platform 50 is shown. The platform 50 may be part of a mobile device having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). The platform 50 may also be part of a fixed device such as, for example, a desktop computer, workstation, and so forth. In the illustrated example, the platform 50 includes a processor 52, an integrated memory controller (IMC) 54, an input output (IO) module 56, system memory 58, a network controller (e.g., network interface controller/NIC) 60, an audio IO device 62, a camera configuration 63, a user interface (UI) 68 and a solid state disk (SSD) 64. The processor 52 may include a core region with one or several processor cores 66.

The illustrated IO module 56, sometimes referred to as a Southbridge or South Complex of a chipset, functions as a host controller and communicates with the network controller 60, which could provide off-platform communication functionality for a wide variety of purposes such as, for example, cellular telephone (e.g., W-CDMA (UMTS), CDMA2000 (IS-856/IS-2000), etc.), WiFi, 4G LTE (Fourth Generation Long Term Evolution), Bluetooth, WiMax (e.g., IEEE 802.16-2004, LAN/MAN Broadband Wireless LANS), Global Positioning System (GPS), spread spectrum (e.g., 900 MHz), and other radio frequency (RF) telephony purposes. The IO module 56 may also include one or more wireless hardware circuit blocks to support such functionality. Although the processor 52 and IO module 56 are illustrated as separate blocks, the processor 52 and IO module 56 may be implemented as a system on chip (SoC) on the same semiconductor die.

The audio IO device 62 may include a microphone, such as the microphone 22 (FIG. 2), to receive audio input associated with a dictation and/or transcription application. The camera configuration 63 may obtain image data that contains depth information, wherein the image data captures one or more hand gestures associated with the dictation and/or transcription application. Thus, the camera configuration 63 may be similar to the camera configuration 26 (FIG. 2), already discussed. The SSD 64 may include one or more NAND (negated AND) chips and might be used to provide high capacity data storage and/or a significant amount of parallelism. There may also be solutions that include NAND controllers implemented as separate ASIC controllers being connected to the IO module 64 on standard buses such as a Serial ATA (SATA, e.g., SATA Rev. 3.0 Specification, May 27, 2009, SATA International Organization/SATA-IO) bus, or a PCI Express Graphics (PEG, e.g., Peripheral Components Interconnect/PCI Express x16 Graphics 150W-ATX Specification 1.0, PCI Special Interest Group) bus. The SSD 64 could also be used as a USB flash storage device.

The illustrated cores 66 of the processor 64 are configured to execute recognition system logic 70 that generates text based on speech input, recognizes one or more hand gestures based on the image data from the camera configuration 63, and conducts an adaptation of the text based on the hand gestures. The UI 68 may include a display device to present the adapted text to a user.

Thus, techniques described herein may significantly improve the user experience by obviating any need to manipulate an entry device such as a keyboard or mouse during recognizing of speech input as well as during playback of previously recognized text. In addition, awkward spoken punctuation may be eliminated so that the speech input may be dedicated to the primary content. As a result, the speed of the dictation/transcription can be substantially increased.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A speech recognition method comprising:
generating text based on speech input using a speech module;
receiving image data that supplements the speech input using a recognition system and one or more of an infrared camera, a time of flight camera and a plurality of stereoscopic cameras;
recognizing, by a speech and gesture recognition apparatus, one or more hand gestures based on wearable accelerometer device data using a gesture module, wherein recognizing the one or more hand gestures includes identifying one or more of fingers and a direction of movement;
associating, by the speech and gesture recognition apparatus, the one or more hand gestures with an operation using the recognition system and including one or more of a punctuation insertion, a cursor movement, a text selection, a capitalization, a pause of speech recognition, a resume of speech recognition and an application-specific action; and
conducting, by the speech and gesture recognition apparatus, an adaptation of the text using an adaptation module, wherein the adaptation includes the operation,
wherein the application-specific action includes switching between a value mode and a formula mode in a cell of a spreadsheet application based on the one or more recognized hand gestures.

2. The method of claim 1, wherein identifying the direction of movement includes identifying one or more of a three dimensional direction of movement and a rotational direction of movement.

3. The method of claim 1, wherein the one or more hand gestures are recognized during one or more of generation of the text based on the speech input and playback of the text.

4. The method of claim 1, wherein recognizing the one or more hand gestures includes recognizing one or more in-air hand gestures.

5. A platform comprising:
a microphone to receive speech input;
a recognition system including,
a speech module to generate text based on the speech input,
a gesture module to recognize one or more hand gestures based on wearable accelerometer device data, and
an adaptation module to conduct an adaptation of the text based on the one or more hand gestures and to associate the one or more hand gestures with an operation including one or more of a punctuation insertion, a cursor movement, a text selection, a capitalization, a pause of speech recognition, a resume of speech recognition and an application-specific action, wherein the adaptation of the text is to include the operation; and
a display device to present the text,
wherein the application-specific action includes switching between a value mode and a formula mode in a cell of a spreadsheet application based on the one or more recognized hand gestures.

6. The platform of claim 5, wherein the gesture module is to identify one or more of fingers and a direction of movement to recognize the one or more hand gestures.

7. The platform of claim 6, wherein one or more of a three dimensional direction of movement and a rotational direction of movement are to be identified by the gesture module.

8. The platform of claim 5, wherein the one or more hand gestures are to be recognized by the gesture module during generation of the text.

9. The platform of claim 5, wherein the one or more hand gestures are to be recognized by the gesture module during playback of the text.

10. The platform of claim 5, wherein one or more in-air hand gestures are to be recognized by the gesture module.

11. The platform of claim 5, further including one or more of an infrared camera, a time of flight camera and a plurality of stereoscopic cameras to generate the image data.

12. An apparatus comprising:
a speech module to generate text based on speech input associated with a microphone;
a gesture module to recognize one or more hand gestures based on wearable accelerometer device data; and
an adaptation module to conduct an adaptation of the text based on the one or more hand gestures, and to associate the one or more hand gestures with an operation including one or more of a punctuation insertion, a cursor movement, a text selection, a capitalization, a pause of speech recognition, a resume of speech recognition and an application-specific action, wherein the adaptation of the text is to include the operation,
wherein the application-specific action includes switching between a value mode and a formula mode in a cell of a spreadsheet application based on the one or more hand gestures, and
wherein one or more of the speech module, the gesture module or the adaptation module are implemented at least partly in fixed-functionality logic hardware.

13. The apparatus of claim 12, wherein the gesture module is to identify one or more of fingers and a direction of movement to recognize the one or more hand gestures.

14. The apparatus of claim 13, wherein one or more of a three dimensional direction of movement and a rotational direction of movement are to be identified by the gesture module.

15. The apparatus of claim 12, wherein the one or more hand gestures are to be recognized by the gesture module during generation of the text.

16. The apparatus of claim 12, wherein the one or more hand gestures are to be recognized by the gesture module during playback of the text.

17. The apparatus of claim 12, wherein one or more in-air hand gestures are to be recognized by the gesture module.

18. The apparatus of claim 12, wherein the gesture module is to receive the image data from one or more of an infrared camera, a time of flight camera and a plurality of stereoscopic cameras.

19. A non-transitory computer readable storage medium comprising a set of instructions which, if executed by a processor, cause a computer to:
generate text based on speech input associated with a microphone;
recognize one or more hand gestures based on wearable accelerometer device data; and
conduct an adaptation of the text based on the one or more hand gestures,
wherein the instructions, if executed, cause a computer to associate the one or more hand gestures with an operation including one or more of a punctuation insertion, a cursor movement, a text selection, a capitalization, a pause of speech recognition, a resume of speech recognition and an application-specific action, wherein the adaptation of the text is to include the operation, and
wherein the application-specific action includes switching between a value mode and a formula mode in a cell of a spreadsheet application based on the one or more recognized hand gestures.

20. The medium of claim 19, wherein the instructions, if executed, cause a computer to identify one or more of fingers and a direction of movement to recognize the one or more hand gestures.

21. The medium of claim 20, wherein one or more of a three dimensional direction of movement and a rotational direction of movement are to be identified.

22. The medium of claim 19, wherein the one or more hand gestures are to be recognized during generation of the text based on the speech input.

23. The medium of claim 19, wherein the one or more hand gestures are to be recognized during playback of the text.

24. The medium of claim 19, wherein one or more in-air hand gestures are to be recognized.

25. The medium of claim 19, wherein the instructions, if executed, cause a computer to receive the image data from one or more of an infrared camera, a time of flight camera and a plurality of stereoscopic cameras.

* * * * *